(12) United States Patent
Nagao (10) Patent No.: US 10,240,700 B2
(45) Date of Patent: Mar. 26, 2019

(54) EXPANSION JOINT AND COMPRESSION SYSTEM (71) Applicant: MITSUBISHI HEAVY INDUSTRIES COMPRESSOR CORPORATION, Tokyo (JP)

(72) Inventor: Hideki Nagao, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 884 days.

(21) Appl. No.: 14/768,627

(22) PCT Filed: Feb. 22, 2013

(86) PCT No.: PCT/JP2013/054545
§ 371 (c)(1),
(2) Date: Aug. 18, 2015

(87) PCT Pub. No.: WO2014/128924
PCT Pub. Date: Aug. 28, 2014

(65) Prior Publication Data
US 2016/0003389 A1    Jan. 7, 2016

(51) Int. Cl.
*F16L 27/12* (2006.01)
*F04D 25/16* (2006.01)
(Continued)

(52) U.S. Cl.
CPC ............ *F16L 27/12* (2013.01); *F04D 25/163* (2013.01); *F04D 29/4206* (2013.01);
(Continued)

(58) Field of Classification Search
CPC ....... F16L 27/1012; F16L 27/12; F16L 51/00; F16L 51/02; F16L 51/035
See application file for complete search history.

(56) References Cited

U.S. PATENT DOCUMENTS 1,513,315 A    10/1924   Cook
2,308,757 A *   1/1943   Hulsberg ................ F16L 27/12
                                                       126/119
(Continued)

FOREIGN PATENT DOCUMENTS

CN         102022338 A    4/2011
CN         202252575 U    5/2012
(Continued)

OTHER PUBLICATIONS

International Search Report dated May 28, 2013 issued in Application No. PCT/JP2013/054545.
(Continued)

*Primary Examiner* — James M Hewitt, II
(74) *Attorney, Agent, or Firm* — Birch, Stewart, Kolasch & Birch, LLP (57) ABSTRACT

An expansion joint, which connects pipes to each other and is capable of expanding and contracting, the joint being provided with: a first end pipe and a second end pipe; a connecting pipe for connecting the first end pipe to the second end pipe so as to be capable of approaching and separating from each other; and a thrust-absorbing device having a pressure chamber, which can expand and contract in the direction in which the first end pipe and the second end pipe are linked and into which a fluid pressure that differs from the pressure inside the pipes can be introduced, the pressure chamber comprising a first pressure-receiving section, which is fixed to the first end pipe and faces in the direction from the second end pipe toward the first end pipe, and a second pressure-receiving section, which is fixed to the second end pipe and faces in the direction from the first end pipe towards the second end pipe.

16 Claims, 4 Drawing Sheets

(51) Int. Cl.
  *F04D 29/42* (2006.01)
  *F04D 29/60* (2006.01)
  *F16L 51/03* (2006.01)
  *F04D 29/62* (2006.01)
  *F16L 21/03* (2006.01)
  *F16L 27/10* (2006.01)
  *F16L 51/00* (2006.01)
  *F04D 29/64* (2006.01)

(52) U.S. Cl.
  CPC ......... *F04D 29/601* (2013.01); *F04D 29/624* (2013.01); *F16L 21/03* (2013.01); *F16L 27/1012* (2013.01); *F16L 51/00* (2013.01); *F16L 51/035* (2013.01); *F04D 29/644* (2013.01); *F05D 2230/642* (2013.01)

(56) References Cited

U.S. PATENT DOCUMENTS

| | | | |
|---|---|---|---|
| 2,348,833 A | | 5/1944 | Miller |
| 3,889,985 A | * | 6/1975 | Gartmann ............... F16L 27/12 285/145.1 |
| 4,603,887 A | * | 8/1986 | Mayfield ................ E21B 21/02 285/298 |
| 4,687,639 A | | 8/1987 | Whiteside, II |
| 4,720,124 A | | 1/1988 | Taylor et al. |
| 6,371,524 B1 | * | 4/2002 | Noda ................... F16L 27/1133 285/110 |

FOREIGN PATENT DOCUMENTS

| | | |
|---|---|---|
| FR | 1358270 | 3/1964 |
| FR | 2174343 | 9/1973 |
| JP | 6-31665 B2 | 4/1994 |
| JP | 2008-215607 A | 9/2006 |
| JP | 2007-332826 | 12/2007 |
| WO | WO 2011/141758 A1 | 11/2011 |
| WO | WO-2013005802 A1 * | 1/2013 ............ F16L 27/026 |

OTHER PUBLICATIONS

Written Opinion dated May 28, 2013 issued in PCT/JP2013/054545.
Office Action dated Mar. 24, 2016 in counterpart Application No. CN 201380073260.5 with partial English Translation.
Office Action dated Jul. 22, 2016 in Counterpart Application No. EP 13875509.5.
EESR, dated Nov. 15, 2015, in related application No. 13875509.5.
EESR, dated Nov. 25, 2015, in related application No. 13875509.5.

* cited by examiner

EXPANSION JOINT AND COMPRESSION SYSTEM

TECHNICAL FIELD

The present invention relates to an expansion joint and a compression system.

BACKGROUND ART

As a joint which connects pipes to each other, there is an expansion joint which absorbs the thermal expansion of the pipe. As the expansion joint, there is an expansion joint having a structure which cancels a thrust due to an internal pressure which is generated in a direction separating pipes from each other or bringing pipes close to each other. For example, PTL 1 discloses an expansion joint using three bellows. The expansion joint specifically has the following structure. A guide flange section is mounted on each of both ends of one small-diameter bellows. A guide flange section is mounted on each of both ends of another small-diameter bellows. These small-diameter bellows are arranged in series and the facing guide flange sections among the guide flange sections mounted on these small-diameter bellows are connected by a large-diameter bellows. The guide flange section mounted on the side opposite to the large-diameter bellows of the small-diameter bellows on one side and the guide flange section mounted on the large-diameter bellows side of the small-diameter bellows on the other side are connected by a tie rod. The guide flange section mounted on the side opposite to the large-diameter bellows of the small-diameter bellows on the other side and the guide flange section mounted on the large-diameter bellows side of the small-diameter bellows on one side are connected by a tie rod.

CITATION LIST

Patent Literature

[PTL 1] Japanese Unexamined Patent Application Publication No. 2008-215607

SUMMARY OF INVENTION

Technical Problem

In the expansion joint having the above structure, in order to cancel a thrust, it is necessary to make the cross-sectional area in a direction orthogonal to an axis of the large-diameter bellows be twice that of the small-diameter bellows. For this reason, an increase in the size thereof is performed.

The present invention has been made in view of the above circumstances and has an object to provide an expansion joint and a compression system in which a reduction in the size thereof is possible.

Solution to Problem

A first aspect of an expansion joint according to the present invention is an expansion joint which connects pipes to each other and is capable of expanding and contracting, including: an end pipe on one side and an end pipe on the other side; a connecting pipe which connects the end pipe on one side and the end pipe on the other side so as to be capable of coming close to each other and separating from each other; and thrust-absorbing means having a pressure chamber which can expand and contract in a direction connecting the end pipe on one side and the end pipe on the other side and into which a fluid pressure different from a pressure in the pipes can be introduced, the pressure chamber having a pressure-receiving section on one side, which is fixed to the end pipe on one side and faces in a direction from the end pipe the other side to the end pipe on one side, and a pressure-receiving section on the other side, which is fixed to the end pipe on the other side and faces in a direction from the end pipe on one side to the end pipe on the other side.

As a second aspect of the expansion joint according to the present invention, the pressure-receiving section on one side in the expansion joint according to the first aspect may be provided in an annular member on one side, which is fixed in an axial range of an outer peripheral surface of the end pipe on one side, and the pressure-receiving section on the other side in the expansion joint according to the first aspect may be provided in an annular member on the other side, which is fixed to an extension section extending toward the end pipe on one side from an outer peripheral surface of the end pipe on the other side and is disposed on a side opposite to the end pipe on the other side of the annular member on one side.

As a third aspect of the expansion joint according to the present invention, the annular member on the other side in the expansion joint according to the second aspect may be provided with a tubular portion extending in a direction of the annular member on one side from an outer peripheral portion, and the expansion joint according to the second aspect may further include a seal member on one side, which seals a gap between an outer peripheral portion of the end pipe on one side and an inner peripheral portion of the annular member on the other side, and a seal member on the other side, which seals a gap between an inner peripheral portion of the tubular portion of the annular member on the other side and an outer peripheral portion of the annular member on one side.

As a fourth aspect of the expansion joint according to the present invention, at least one of the seal member on one side and the seal member on the other side in the expansion joint according to the third aspect may be a lip seal.

As a fifth aspect of the expansion joint according to the present invention, at least one of the seal member on one side and the seal member on the other side in the expansion joint according to the third aspect may be an O-ring.

As a sixth aspect of the expansion joint according to the present invention, the annular member on one side and the annular member on the other side in the expansion joint according to the second aspect may be connected by a bellows.

A first aspect of a compression system according to the present invention is a compression system in which pipes are connected by the expansion joint described above.

As a second aspect of the compression system according to the present invention, the compression system according to the first aspect may include compression mechanisms of plural stages, wherein a pipe for circulating a compressed gas discharged from the compression mechanism of an upstream stage and a pipe for circulating a compressed gas which is supplied to the compression mechanism of a downstream stage may be connected by the expansion joint.

As a third aspect of the compression system according to the present invention, the thrust-absorbing means of the expansion joint in the compression system according to the second aspect may be provided with a supply pipe which supplies a compressed gas compressed in the compression mechanism further toward the downstream side than the expansion joint.

As a fourth aspect of the compression system according to the present invention, the compression system according to any one of the first aspect to the third aspect may further include pressure adjustment means for adjusting a fluid pressure which is supplied to the thrust-absorbing means.

Advantageous Effects of Invention

According to the expansion joint related to the above aspect of the present invention, a reduction in size becomes possible.

DESCRIPTION OF EMBODIMENTS

Hereinafter, an expansion joint and a compression system according to an embodiment of the present invention will be described.

Figure 1:
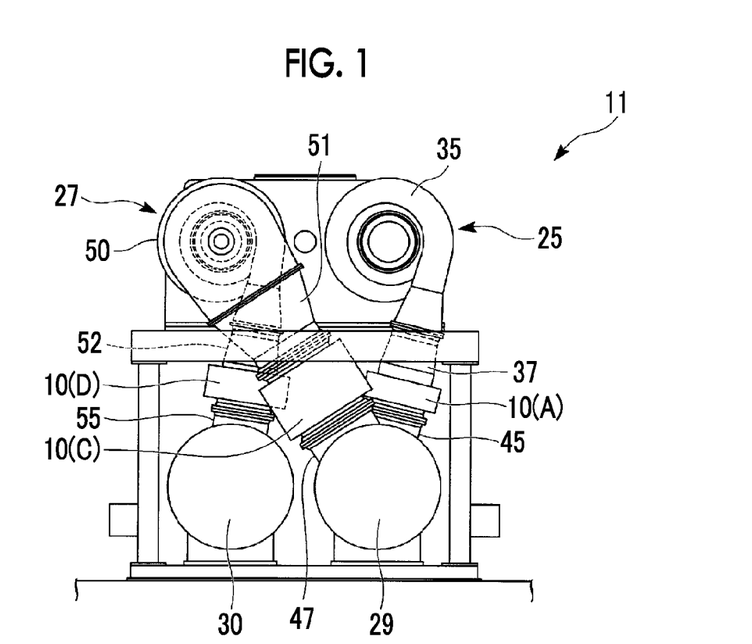
FIG. 1 is a side view showing a compression system which includes an expansion joint according to an embodiment of the present invention.

FIG. 1 shows an expansion joint 10 according to this embodiment and a compression system 11 using the expansion joint 10. A plurality of expansion joints 10 having the same structure are provided in the compression system 11. In a case of distinguishing the plurality of expansion joints 10 from each other, the expansion joints 10 are distinguished by adding (A), (B), (C), (D), or (E) to the respective signs.

Figure 2:
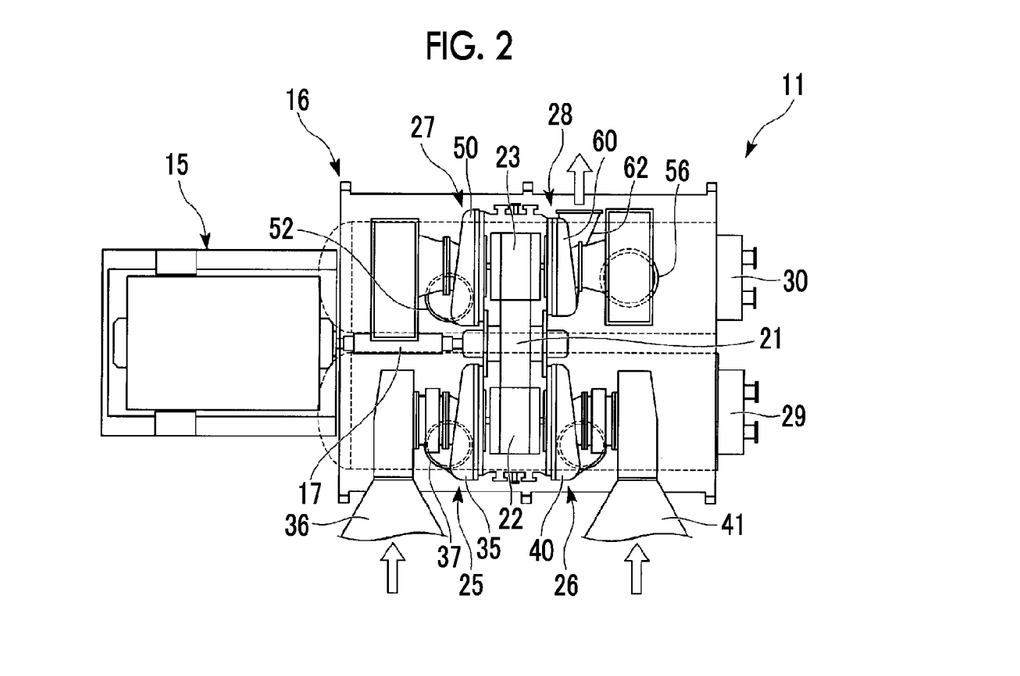
FIG. 2 is a plan view showing a compression system according to the embodiment.

The compression system 11 is for producing a compressed gas by compressing a gas and specifically, is for producing compressed air by compressing air. In addition, the compression system 11 may be a compression system which compresses a gas other than air. The compression system 11 has a motor 15 and a compressor 16, as shown in FIG. 2. The motor 15 is driven by electric power, thereby rotating a motor shaft 17.

The compressor 16 is a multi-axis and multi-stage geared compressor. The compressor 16 has a drive gear 21, a low-pressure side pinion shaft 22, and a high-pressure side pinion shaft 23. The drive gear 21 is connected to the motor shaft 17 and rotates by being driven by the motor shaft 17. The low-pressure side pinion shaft 22 and the high-pressure side pinion shaft 23 are engaged with the drive gear 21 and are rotated by the driving of the drive gear 21.

The compressor 16 has low-pressure compression mechanisms 25 and 26 in two places, a medium-pressure compression mechanism 27, a high-pressure compression mechanism 28, a low-pressure gas cooler 29, and a medium-pressure gas cooler 30. That is, the compressor 16 has compression mechanisms of plural stages (specifically, three stages): the low-pressure compression mechanisms 25 and 26, the medium-pressure compression mechanism 27, and the high-pressure compression mechanism 28.

The low-pressure compression mechanism 25 on one side has an impeller (not shown) connected to one end of the low-pressure side pinion shaft 22, and a casing 35 which accommodates the impeller. The low-pressure compression mechanism 25 has an air intake duct 36 as a pipe mounted on one side of the casing 35, and an exhaust air duct 37 as a pipe mounted on the other side of the casing 35, as shown in FIG. 1. The low-pressure compression mechanism 25 draws in outside air from the air intake duct 36 by the rotation of the impeller (not shown), compresses the outside air to a predetermined compression ratio, and then discharges the compressed air from the exhaust air duct 37.

Figure 3:
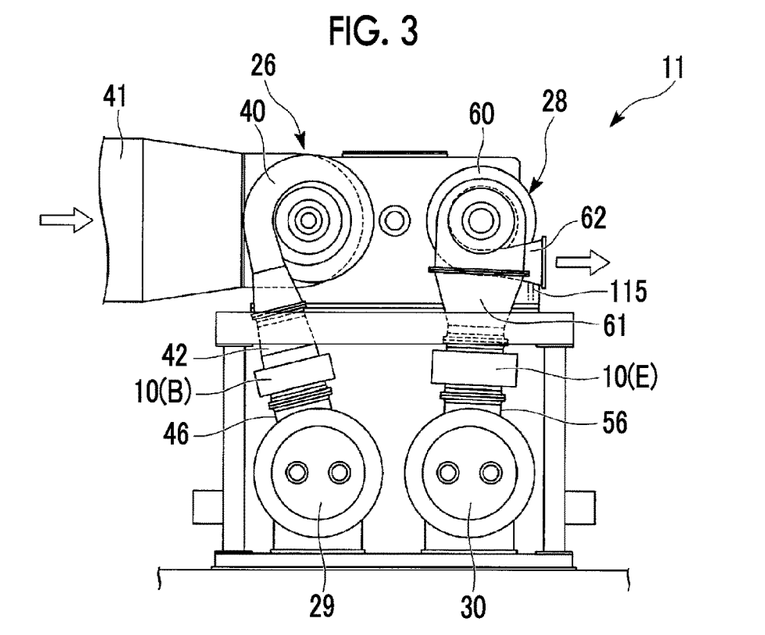
FIG. 3 is a side view showing the compression system according to the embodiment.

As shown in FIG. 2, the low-pressure compression mechanism 26 on the other side has an impeller (not shown) connected to the other end of the low-pressure side pinion shaft 22, and a casing 40 which accommodates the impeller. The low-pressure compression mechanism 26 has an air intake duct 41 as a pipe mounted on one side of the casing 40, and an exhaust air duct 42 as a pipe mounted on the other side of the casing 40, as shown in FIG. 3. The low-pressure compression mechanism 26 draws in outside air from the air intake duct 41 by the rotation of the impeller (not shown), compresses the outside air to a predetermined compression ratio, and then discharges the compressed air from the exhaust air duct 42.

Figure 4:
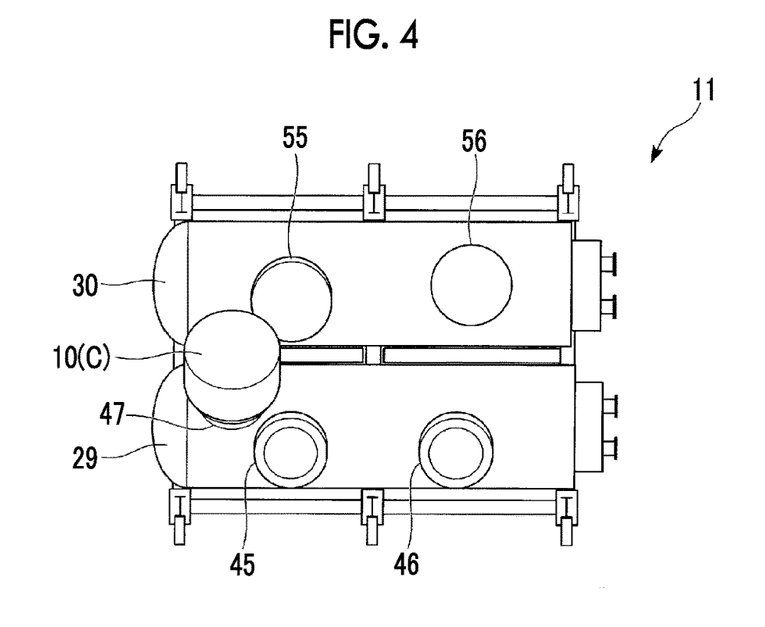
FIG. 4 is a plan view showing a gas cooler of the compression system according to the embodiment.

The low-pressure gas cooler 29 has introduction ports 45 and 46 as pipes in two places, as shown in FIG. 4. As shown in FIG. 1, the introduction port 45 on one side is connected to the exhaust air duct 37 of the low-pressure compression mechanism 25 through the expansion joint 10(A). The compressed air discharged from the low-pressure compression mechanism 25 is introduced into the low-pressure gas cooler 29 through the introduction port 45. As shown in FIG. 3, the introduction port 46 on the other side is connected to the exhaust air duct 42 of the low-pressure compression mechanism 26 through the expansion joint 10(B). The compressed air discharged from the low-pressure compression mechanism 26 is introduced into the low-pressure gas cooler 29 through the introduction port 46. The low-pressure gas cooler 29 cools the compressed air introduced from the introduction ports 45 and 46 while storing the compressed air. The low-pressure gas cooler 29 has a discharge port 47 as a pipe for discharging the stored compressed air, as shown in FIG. 1.

As shown in FIG. 2, the medium-pressure compression mechanism 27 has an impeller (not shown) connected to one end of the high-pressure side pinion shaft 23, and a casing 50 which accommodates the impeller. The medium-pressure compression mechanism 27 has an air intake duct 51 as a pipe mounted on one side of the casing 50, and an exhaust air duct 52 as a pipe mounted on the other side of the casing 50, as shown in FIG. 1. The medium-pressure compression mechanism 27 is connected, at the air intake duct 51, to the discharge port 47 of the low-pressure gas cooler 29 through the expansion joint 10(C), and draws in the compressed air of the low-pressure gas cooler 29 from the air intake duct 51 by the rotation of the impeller (not shown), further compresses the compressed air, and then discharges the compressed air from the exhaust air duct 52.

As described above, the expansion joint 10(A) shown in FIG. 1 connects the exhaust air duct 37 for circulating the compressed air discharged from the low-pressure compression mechanism 25 of an upstream stage, and the introduction port 45 for circulating the compressed air which is supplied to the medium-pressure compression mechanism 27 of a downstream stage through the low-pressure gas cooler 29. The expansion joint 10(B) shown in FIG. 3 connects the exhaust air duct 42 for circulating the compressed air discharged from the low-pressure compression mechanism 26 of the upstream stage, and the introduction port 46 for circulating the compressed air which is supplied to the medium-pressure compression mechanism 27 of the downstream stage through the low-pressure gas cooler 29. The expansion joint 10(C) shown in FIG. 1 connects the discharge port 47 for circulating the compressed air discharged from the low-pressure compression mechanisms 25 and 26 of the upstream stage through the low-pressure gas cooler 29, and the air intake duct 51 for circulating the compressed air which is supplied to the medium-pressure compression mechanism 27 of the downstream stage.

The medium-pressure gas cooler 30 has an introduction port 55 as a pipe, as shown in FIG. 4. As shown in FIG. 1, the introduction port 55 is connected to the exhaust air duct 52 of the medium-pressure compression mechanism 27 through the expansion joint 10(D). The compressed air discharged from the medium-pressure compression mechanism 27 is introduced into the medium-pressure gas cooler 30 through the introduction port 55. The medium-pressure gas cooler 30 cools the compressed air introduced from the introduction port 55 while storing the compressed air. The medium-pressure gas cooler 30 has a discharge port 56 as a pipe for discharging the stored compressed air, as shown in FIG. 3.

As shown in FIG. 2, the high-pressure compression mechanism 28 has an impeller (not shown) connected to the other end of the high-pressure side pinion shaft 23, and a casing 60 which accommodates the impeller. The high-pressure compression mechanism 28 has an air intake duct 61 as a pipe mounted on one side of the casing 60, and an exhaust air duct 62 as a pipe mounted on the other side of the casing 60, as shown in FIG. 3. The high-pressure compression mechanism 28 is connected, at the air intake duct 61, to the discharge port 56 of the medium-pressure gas cooler 30 through the expansion joint 10(E), and draws in the compressed air of the medium-pressure gas cooler 30 from the air intake duct 61 by the rotation of the impeller (not shown), further compresses the compressed air, and then discharges the compressed air from the exhaust air duct 62. Although illustration is omitted, the exhaust air duct 62 is connected to a pipe leading to a supply destination of compressed air.

As described above, the expansion joint 10(D) shown in FIG. 1 connects the exhaust air duct 52 for circulating the compressed air discharged from the medium-pressure compression mechanism 27 of the upstream stage, and the introduction port 55 for circulating the compressed air which is supplied to the high-pressure compression mechanism 28 of the downstream stage through the medium-pressure gas cooler 30. The expansion joint 10(E) shown in FIG. 3 connects the discharge port 56 for circulating the compressed air discharged from the medium-pressure compression mechanism 27 of the upstream stage through the medium-pressure gas cooler 30, and the air intake duct 61 for circulating the compressed air which is supplied to the high-pressure compression mechanism 28 of the downstream stage.

The inside of each of the exhaust air ducts 37 and 42 of the low-pressure compression mechanisms 25 and 26, the expansion joints 10(A) and 10(B), the low-pressure gas cooler 29, the expansion joint 10(C), and the air intake duct 51 of the medium-pressure compression mechanism 27 has a pressure which is higher than atmospheric pressure. The inside of each of the exhaust air duct 52 of the medium-pressure compression mechanism 27, the expansion joint 10(D), the medium-pressure gas cooler 30, the expansion joint 10(E), and the air intake duct 61 of the high-pressure compression mechanism 28 is in a higher pressure state than the exhaust air ducts 37 and 42, the expansion joints 10(A), 10(B), and 10(C), the low-pressure gas cooler 29, and the air intake duct 51. The inside of the exhaust air duct 62 of the high-pressure compression mechanism 28 is in a higher pressure state than the exhaust air duct 52, the expansion joint 10(D), the medium-pressure gas cooler 30, the expansion joint 10(E), and the air intake duct 61.

The expansion joints 10(A) to 10(E) described above have the same structure, although there is a difference in the size of each section according to application conditions. In addition, the application conditions refer to the size and position of a pipe to be connected, the flow rate and pressure of compressed air passing through the inside thereof, or the like. Specifically, the expansion joint 10(A) connecting the exhaust air duct 37 of the low-pressure compression mechanism 25 and the introduction port 45 of the low-pressure gas cooler 29, and the expansion joint 10(B) connecting the exhaust air duct 42 of the low-pressure compression mechanism 26 and the introduction port 46 of the low-pressure gas cooler 29 have common components having the same size. The expansion joint 10(C) connecting the discharge port 47 of the low-pressure gas cooler 29 and the air intake duct 51 of the medium-pressure compression mechanism 27 has a larger size than the expansion joints 10(A) and 10(B) in order to circulate the compressed air from the two low-pressure compression mechanism 25 and 26. The expansion joint 10(D) connecting the exhaust air duct 52 of the medium-pressure compression mechanism 27 and the introduction port 55 of the medium-pressure gas cooler 30 has a smaller size than the expansion joint 10(C). The expansion joint 10(E) connecting the discharge port 56 of the medium-pressure gas cooler 30 and the air intake duct 61 of the high-pressure compression mechanism 28 has a common component having the same size as the expansion joint 10(D).

Figure 5:
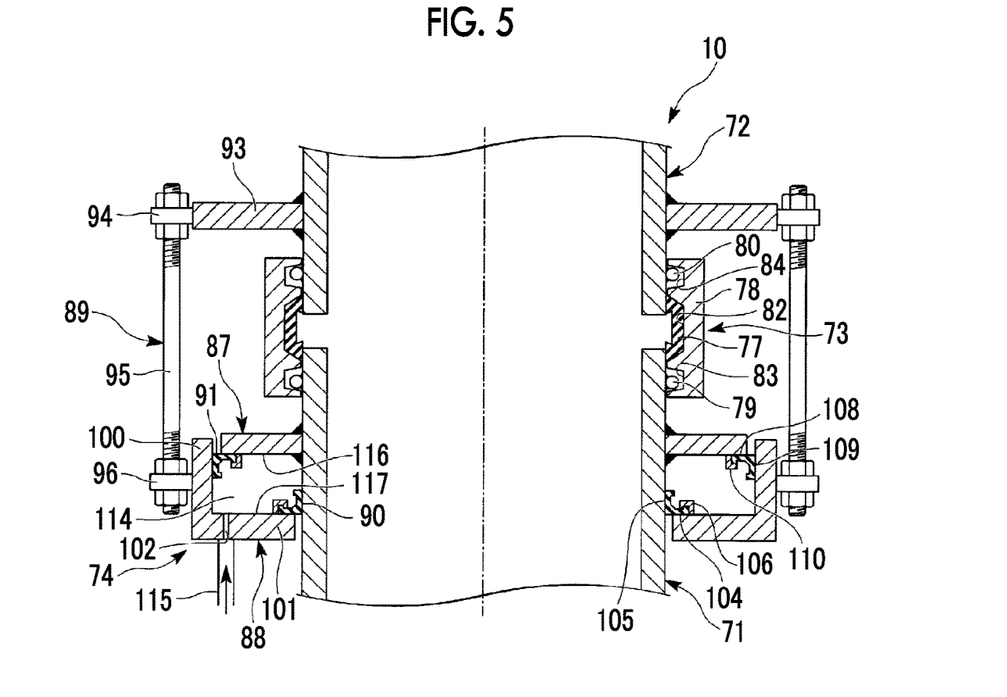
FIG. 5 is a partial cross-sectional view showing the expansion joint according to the embodiment.

As shown in FIG. 5, the expansion joint 10 has two end pipes 71 and 72, a connecting pipe 73, and a thrust absorption mechanism 74 (thrust-absorbing means). The end pipe 71 on one side which is one of the end pipes 71 and 72 has a tubular shape. The end pipe 72 on the other side which is one of the end pipes 71 and 72 also has a tubular shape. The end pipe 71 and the end pipe 72 are disposed in series.

The connecting pipe 73 connects the end pipe 71 and the end pipe 72 so as to be capable of coming close to each other and separating from each other while coaxially disposing the end pipe 71 and the end pipe 72. The connecting pipe 73 has a seal ring 77, a retaining ring 78, and a pair of regulating rings 79 and 80. The seal ring 77 has a tubular shape and is made of rubber. The seal ring 77 comes into contact with an end portion on the end pipe 72 side of the outer peripheral surface of the end pipe 71 at an inner peripheral surface on one side in an axial direction. Further, the seal ring 77 comes into contact with an end portion on the end pipe 71 side of the outer peripheral surface of the end pipe 72 at an inner peripheral surface on the other side in the axial direction.

The regulating ring 79 is fixed further toward the side opposite to the end pipe 72 than the seal ring 77 of the outer peripheral surface of the end pipe 71. The regulating ring 80 is fixed further toward the side opposite to the end pipe 71 than the seal ring 77 of the outer peripheral surface of the end pipe 72. In the retaining ring 78, a central annular groove 82 and a pair of annular grooves 83 and 84 are formed in the inner peripheral surface thereof. The central annular groove 82 is formed at the middle position in the axial direction of the retaining ring 78. The pair of annular grooves 83 and 84 are formed on both sides in the axial direction of the central annular groove 82. The width in the axial direction of the central annular groove 82 is made to be wider than the pair of annular grooves 83 and 84.

The seal ring 77 is fitted into the central annular groove 82. The retaining ring 78 presses the seal ring 77 against the outer peripheral surfaces of the end pipe 71 and the end pipe 72. The annular groove 83 is longer than the regulating ring 79 in the axial direction and is disposed so as to cover the regulating ring 79. Accordingly, the retaining ring 78 can relatively move with respect to the end pipe 71 in the axial direction by an amount corresponding to the gap between the annular groove 83 and the regulating ring 79. The annular groove 84 is longer than the regulating ring 80 in the axial direction and is disposed so as to cover the regulating ring 80. Accordingly, the retaining ring 78 can relatively move with respect to the end pipe 72 in the axial direction by an amount corresponding to the gap between the annular groove 84 and the regulating ring 80. Accordingly, the end pipes 71 and 72 can relatively move in the axial direction in a predetermined range through the retaining ring 78. The seal ring 77 always seals the gap between the end pipes 71 and 72 when the end pipes 71 and 72 relatively move in the axial direction in the predetermined range described above.

The thrust absorption mechanism 74 has two annular members 87 and 88, an extension section 89, and two seal members 90 and 91. The annular member 87 on one side which is one of the two annular members 87 and 88 has a perforated disk shape and is directly fixed to the outer peripheral surface of the end pipe 71 at the inner peripheral surface thereof. Accordingly, the annular member 87 is fixed in an axial range of the outer peripheral surface of the end pipe 71. The annular member 87 extends so as to be orthogonal to an axis of the end pipe 71. The annular member 87 and the end pipe 71 are fixed to each other without a clearance therebetween by welding.

The extension section 89 has a fixing plate 93, a fixing member 94, a tie rod 95, and a fixing member 96. The fixing plate 93 has a perforated disk shape and is directly fixed to the outer peripheral surface of the end pipe 72 on the inner peripheral surface thereof. Accordingly, the fixing plate 93 is fixed in an axial range of the end pipe 72. The fixing plate 93 extends so as to be orthogonal to an axis of the end pipe 72. The fixing member 94 is fixed to an outer peripheral end portion of the fixing plate 93. The tie rod 95 is fixed to the fixing member 94 at one end portion and extends parallel to the end pipes 71 and 72 in the direction of the end pipe 71 from the fixing member 94. Accordingly, the extension section 89 extends toward the end pipe 71 from the outer peripheral surface of the end pipe 72. The tie rod 95 extends to the side opposite to the end pipe 72 of the annular member 87 beyond the outer periphery side of the annular member 87. The fixing member 96 is fixed to the other end portion of the tie rod 95.

The annular member 88 on the other side which is one of the two annular members 87 and 88 has a tubular portion 100 and a basal plate portion 101. The tubular portion 100 has a cylindrical shape and the fixing member 96 of the extension section 89 described above is fixed to the outer peripheral surface thereof. Accordingly, the annular member 88 is fixed to the extension section 89. The tubular portion 100 is disposed further toward the outside in a radial direction than the outer peripheral surface of the annular member 87. The basal plate portion 101 extends radially inward from the side opposite to the end pipe 72 in the axial direction of the tubular portion 100. Accordingly, in the annular member 88, the tubular portion 100 extending in the direction of the annular member 87 from the outer periphery side of the basal plate portion 101 is provided. The basal plate portion 101 has a perforated disk shape and the end pipe 71 is inserted into the inside thereof. A passage hole 102 penetrating in the axial direction is formed in the basal plate portion 101. The basal plate portion 101 of the annular member 88 is disposed on the side opposite to the end pipe 72 of the annular member 87. The basal plate portion 101 is disposed in an axial range of the end pipe 71. The basal plate portion 101 extends so as to be orthogonal to the axis of the end pipe 71.

The seal member 90 on one side which is one of the two seal members 90 and 91 is a lip seal made of rubber and having a lip portion 104 and a lip portion 105. The lip portion 104 has a perforated disk shape, and the lip portion 105 has a cylindrical shape extending in the axial direction from an inner peripheral edge portion of the lip portion 104. Accordingly, the seal member 90 has an L-shaped cross-section.

In the basal plate portion 101 of the annular member 88, a locking member 106 is fixed to the inner periphery side thereof on the annular member 87 side in the axial direction. The seal member 90 is locked to the locking member 106 at the lip portion 104. The seal member 90 is in contact with an end face on the annular member 87 side of the basal plate portion 101 of the annular member 88 at the lip portion 104. Further, the seal member 90 comes into sliding contact with the outer peripheral surface of the end pipe 71 at the lip portion 105. In this way, the seal member 90 seals the gap between an outer peripheral portion of the end pipe 71 and an inner peripheral portion of the basal plate portion 101 of the annular member 88.

The seal member 91 on the other side which is one of the two seal members 90 and 91 is a lip seal having a lip portion 108 and a lip portion 109. The lip portion 108 has a perforated disk shape, and the lip portion 109 has a cylindrical shape extending in the axial direction from an outer peripheral edge portion of the lip portion 108. Accordingly, the seal member 91 has an L-shaped cross-section.

In the annular member 87, a locking member 110 is fixed to the outer periphery side thereof on the annular member 88 side in the axial direction. The seal member 91 is locked to the locking member 110 at the lip portion 108. That is, the seal member 91 is in contact with an end face on the annular member 87 at the lip portion 108. Further, the seal member 91 comes into sliding contact with the inner peripheral surface of the tubular portion 100 of the annular member 88 at the lip portion 109. In this way, the seal member 91 seals the gap between an inner peripheral portion of the tubular portion 100 of the annular member 88 and an outer peripheral portion of the annular member 87.

A portion surrounded by the end pipe 71, the annular members 87 and 88, and the seal members 90 and 91 described above configures a pressure chamber 114. A fluid pressure on the outside can be introduced into the pressure chamber 114 through the passage hole 102 of the annular member 88 and a supply pipe 115 communicating with the passage hole 102.

As described above, the annular member 87 is fixed to the end pipe 71 and moves integrally with the end pipe 71. The annular member 88 is fixed to the end pipe 72 through the extension section 89 and moves integrally with the end pipe 72. If the end pipes 71 and 72 come close to each other in the axial direction, the annular members 87 and 88 separate from each other in the axial direction. If the end pipes 71 and 72 separate from each other in the axial direction, the annular members 87 and 88 come close to each other in the axial direction. Accordingly, the pressure chamber 114 expands in the axial direction if the end pipes 71 and 72 come close to each other in the axial direction, and contracts in the axial direction if the end pipes 71 and 72 separate from each other in the axial direction. That is, the pressure chamber 114 can expand and contract in a direction connecting the end pipe 71 and the end pipe 72.

The pressure chamber 114 has two pressure-receiving sections 116 and 117 facing each other. The pressure-receiving section 116 on one side which is one of the pressure-receiving sections 116 and 117 is formed at the annular member 87 fixed to the end pipe 71. Accordingly, the pressure-receiving section 116 is fixed to the end pipe 71. The pressure-receiving section 116 faces in the direction from the end pipe 72 to the end pipe 71 (a downward direction in FIG. 5).

The pressure-receiving section 117 on the other side which is one of the pressure-receiving sections 116 and 117 is formed at the basal plate portion 101 of the annular member 88 fixed to the end pipe 72. Accordingly, the pressure-receiving section 117 is fixed to the end pipe 72. The pressure-receiving section 117 faces in the direction from the end pipe 71 to the end pipe 72 (an upward direction in FIG. 5).

If a pressure which is higher than atmospheric pressure is introduced into the pressure chamber 114 through the supply pipe 115, the pressure-receiving sections 116 and 117 facing each other receive a force in a direction which separates them from each other. Conversely, if a pressure lower than atmospheric pressure is introduced into the pressure chamber 114, the pressure-receiving sections 116 and 117 facing each other receive a force in a direction which brings them closer to each other. At this time, the product of a cross-sectional area Ai of the end pipe 71 and an internal pressure Pi and the product of an area Ac of the pressure-receiving section 116 and an internal pressure Pc of the pressure chamber 114 are made to equal to each other. In this way, a thrust which is generated in the end pipe 71 is cancelled. Similarly, the product of the cross-sectional area Ai of the end pipe 72 and the internal pressure Pi and the product of the area Ac of the pressure-receiving section 117 and the internal pressure Pc of the pressure chamber 114 are made to equal to each other. In this way, a thrust which is generated in the end pipe 72 is cancelled.

Specifically, in the expansion joints 10(A) to 10(E), a pressure from the exhaust air duct 62 of the high-pressure compression mechanism 28 shown in FIG. 3 is introduced into the pressure chambers 114 of the respective thrust absorption mechanisms 74 through the supply pipe 115. That is, the supply pipe 115 supplies the compressed air compressed in the high-pressure compression mechanism 28 further toward the downstream side than the expansion joints 10(A) to 10(E), to the thrust absorption mechanisms 74 of the expansion joints 10(A) to 10(E).

Accordingly, a gas pressure which is different from and is a pressure higher than the pressure in the exhaust air duct 37 and the introduction port 45 which are connected by the expansion joint 10(A) is introduced into the pressure chamber 114 of the thrust absorption mechanism 74 of the expansion joint 10(A). Here, in the end pipes 71 and 72 of the expansion joint 10(A), a thrust in a direction away from each other is generated due to the inner gas pressure. As a result, a thrust in a direction away from each other is generated in the exhaust air duct 37 and the introduction port 45 due to the inner gas pressure. In contrast, the pressure-receiving section 116 of the pressure chamber 114 receives a gas pressure in a direction bringing the end pipe 71 close to the end pipe 72. Further, the pressure-receiving section 117 receives a gas pressure in a direction bringing the end pipe 72 close to the end pipe 71. That is, in the thrust absorption mechanism 74, a thrust in a direction cancelling the thrust in the exhaust air duct 37 and the introduction port 45 is generated.

At this time, the pressure-receiving areas of the pressure-receiving sections 116 and 117 with respect to the cross-sectional areas of the exhaust air duct 37 and the introduction port 45 are set such that the thrust which is generated in the exhaust air duct 37 and the introduction port 45 due to the inner gas pressure (that is, the thrust which is generated in the end pipes 71 and 72) balances with the thrust which is generated in the end pipes 71 and 72 by the thrust absorption mechanism 74. Into the pressure chamber 114, a gas pressure higher than the pressure in the exhaust air duct 37 and the introduction port 45 is introduced. For this reason, it is possible to make the pressure-receiving areas of the pressure-receiving sections 116 and 117 smaller than the cross-sectional areas of the exhaust air duct 37 and the introduction port 45. Accordingly, the expansion joint 10(A) which includes the thrust absorption mechanism 74 can be reduced in size in the radial direction.

Also into the pressure chamber 114 of the thrust absorption mechanism 74 of the expansion joint 10(B), a gas pressure which is different from and is a pressure higher than the pressure in the exhaust air duct 42 and the introduction port 46 which are connected by the expansion joint 10(B) is introduced. Also into the pressure chamber 114 of the thrust absorption mechanism 74 of the expansion joint 10(C), a gas pressure which is different from and is a pressure higher than the pressure in the discharge port 47 and the air intake duct 51 which are connected by the expansion joint 10(C) is introduced. Also into the pressure chamber 114 of the thrust absorption mechanism 74 of the expansion joint 10(D), a gas pressure which is different from and is a pressure higher than the pressure in the exhaust air duct 52 and the introduction port 55 which are connected by the expansion joint 10(D) is introduced. Also into the pressure chamber 114 of the thrust absorption mechanism 74 of the expansion joint 10(E), a gas pressure which is different from and is a pressure higher than the pressure in the discharge port 56 and the air intake duct 61 which are connected by the expansion joint 10(E) is introduced. Also with respect to the expansion joints 10(B) to 10(E), the pressure-receiving areas of the pressure-receiving sections 116 and 117 are set so as to cancel the thrust by the gas pressure in the end pipes 71 and 72, in the same manner as in the expansion joint 10(A). Accordingly, also with respect to the expansion joints 10(B) to 10(C), a reduction in size in the radial direction is possible, similar to the expansion joint 10(A).

In the expansion joint 10 of the above-described embodiment, the pressure chamber 114 of the thrust absorption mechanism 74 can expand and contract in a direction connecting the end pipes 71 and 72. The pressure chamber 114 has the pressure-receiving section 116 which is fixed to the end pipe 71 and faces in the direction from the end pipe 72 to the end pipe 71. The pressure chamber 114 has the pressure-receiving section 117 on the other side, which is fixed to the end pipe 72 and faces in the direction from the end pipe 71 to the end pipe 72. With these configurations, in a case where the pressure in the pipes which are connected by the expansion joint 10 is positive pressure, by introducing a pressure higher than the pressure into the pressure chamber 114, it is possible to cancel a thrust which is generated in the pipes, even if the pressure-receiving sections 116 and 117 are reduced in size. As a result, the expansion joint 10 which includes the thrust absorption mechanism 74 can be reduced in size.

Further, the pressure-receiving section 116 is provided in the annular member 87 which is fixed in an axial range of the outer peripheral surface of the end pipe 71. The pressure-receiving section 117 is provided in the annular member 88 which is fixed to the extension section 89 extending toward the end pipe 71 from the outer peripheral surface of the end pipe 72 and is disposed on the side opposite to the end pipe 72 of the annular member 87. With these configurations, the expansion joint 10 which includes the thrust absorption mechanism 74 can be reliably reduced in size.

Further, in the annular member 88, the tubular portion 100 extending in the direction of the annular member 87 from the outer peripheral portion is provided. The gap between the outer peripheral portion of the end pipe 71 and the inner peripheral portion of the annular member 88 is sealed by the seal member 90. The gap between the inner peripheral portion of the tubular portion 100 of the annular member 88 and the outer peripheral portion of the annular member 87 is sealed by the seal member 91. With these configurations, it is possible to make the pressure chamber 114 be able to expand and contract with a simple structure.

Further, the seal member 90 is made to be a lip seal. Accordingly, the seal member 90 is brought into close contact with the end pipe 71 and the annular member 88 by the pressure in the pressure chamber 114. Therefore, it is possible to obtain excellent sealability. The seal member 91 is also made to be a lip seal. Accordingly, the seal member 91 is brought into close contact with the annular members 87 and 88 by the pressure in the pressure chamber 114. Therefore, it is possible to obtain excellent sealability.

In the compression system 11 of the above-described embodiment, the exhaust air duct 37 as a pipe and the introduction port 45 as a pipe are connected by the expansion joint 10(A). Further, the exhaust air duct 42 as a pipe and the introduction port 46 as a pipe are connected by the expansion joint 10(B). Further, the discharge port 47 as a pipe and the air intake duct 51 as a pipe are connected by the expansion joint 10(C). Further, the exhaust air duct 52 as a pipe and the introduction port 55 as a pipe are connected by the expansion joint 10(D). Further, the discharge port 56 as a pipe and the air intake duct 61 as a pipe are connected by the expansion joint 10(E). As described above, the expansion joints 10(A) to 10(E) can be reduced in size, and therefore, it is possible to attain a compact layout of each pipe, and thus it becomes possible to attain a reduction in the size of the entirety of the compression system 11.

The compression system 11 has the low-pressure compression mechanism 25 and 26, the medium-pressure compression mechanism 27, and the high-pressure compression mechanism 28 of plural stages. Then, the exhaust air duct 37 for circulating the compressed air discharged from the low-pressure compression mechanism 25 of the upstream stage and the introduction port 45 for circulating the compressed air which is supplied to the medium-pressure compression mechanism 27 of the downstream stage are connected by the expansion joint 10(A). Along with this, the compressed air compressed in the high-pressure compression mechanism 28 further toward the downstream side than the expansion joint 10(A) is supplied to the thrust absorption mechanism 74 of the expansion joint 10(A) by the supply pipe 115. As a result, the expansion joint 10(A) which includes the thrust absorption mechanism 74 can be reduced in size. Therefore, in particular, it is possible to attain a compact layout of the pipe connecting the low-pressure compression mechanism 25 and the medium-pressure compression mechanism 27.

Similarly, the exhaust air duct 42 for circulating the compressed air discharged from the low-pressure compression mechanism 26 of the upstream stage and the introduction port 46 for circulating the compressed air which is supplied to the medium-pressure compression mechanism 27 of the downstream stage are connected by the expansion joint 10(B). Along with this, the compressed air compressed in the high-pressure compression mechanism 28 further toward the downstream side than the expansion joint 10(B) is supplied to the thrust absorption mechanism 74 of the expansion joint 10(B) by the supply pipe 115. As a result, the expansion joint 10(B) which includes the thrust absorption mechanism 74 can be reduced in size. Therefore, in particular, it is possible to attain a compact layout of the pipe connecting the low-pressure compression mechanism 26 and the medium-pressure compression mechanism 27.

Similarly, the discharge port 47 for circulating the compressed air discharged from the low-pressure compression mechanisms 25 and 26 of the upstream stage and the air intake duct 51 for circulating the compressed air which is supplied to the medium-pressure compression mechanism 27 of the downstream stage are connected by the expansion joint 10(C). Along with this, the compressed air compressed in the high-pressure compression mechanism 28 further toward the downstream side than the expansion joint 10(C) is supplied to the thrust absorption mechanism 74 of the expansion joint 10(C) by the supply pipe 115. As a result, the expansion joint 10(C) which includes the thrust absorption mechanism 74 can be reduced in size. Therefore, in particular, it is possible to attain a compact layout of the pipe connecting the low-pressure compression mechanisms 25 and 26 and the medium-pressure compression mechanism 27.

Similarly, the exhaust air duct 52 for circulating the compressed air discharged from the medium-pressure compression mechanism 27 of the upstream stage and the introduction port 55 for circulating the compressed air which is supplied to the high-pressure compression mechanism 28 of the downstream stage are connected by the expansion joint 10(D). Along with this, the compressed air compressed in the high-pressure compression mechanism 28 further toward the downstream side than the expansion joint 10(D) is supplied to the thrust absorption mechanism 74 of the expansion joint 10(D) by the supply pipe 115. As a result, the expansion joint 10(D) which includes the thrust absorption mechanism 74 can be reduced in size. Therefore, in particular, it is possible to attain a compact layout of the pipe connecting the medium-pressure compression mechanism 27 and the high-pressure compression mechanism 28.

Similarly, the discharge port 56 for circulating the compressed air discharged from the medium-pressure compression mechanism 27 of the upstream stage and the air intake duct 61 for circulating the compressed air which is supplied to the high-pressure compression mechanism 28 of the downstream stage are connected by the expansion joint 10(E). Along with this, the compressed air compressed in the high-pressure compression mechanism 28 further toward the downstream side than the expansion joint 10(E) is supplied to the thrust absorption mechanism 74 of the expansion joint 10(E) by the supply pipe 115. As a result, the expansion joint 10(E) which includes the thrust absorption mechanism 74 can be reduced in size. Therefore, in particular, it is possible to attain a compact layout of the pipe connecting the medium-pressure compression mechanism 27 and the high-pressure compression mechanism 28.

In the compression system 11, a fluid pressure for being introduced into the thrust absorption mechanisms 74 of the expansion joint 10(A) to the expansion joint 10(E) can be produced in the compression system 11. Therefore, separate fluid pressure supply means from the compression system 11 is not required, and thus cost can be reduced.

In addition, the present invention is not limited to the above-described embodiment and includes forms in which various changes are applied to the above-described embodiment within a scope which does not depart from the gist of the present invention. That is, specific shapes, configurations, or the like mentioned in the embodiment are merely examples, and changes can be appropriately made thereto.

Figure 6:
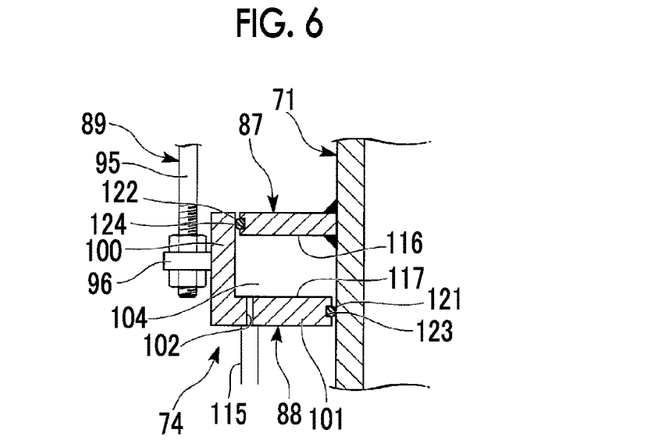
FIG. 6 is a partial cross-sectional view showing a modified example of the expansion joint according to the embodiment.

For example, in the thrust absorption mechanism 74, instead of the seal members 90 and 91 which are lip seals, seal members 121 and 122 which are O-rings may be provided, as shown in FIG. 6. In this case, a concave portion 123 recessed radially outward is formed in the inner peripheral surface of the basal plate portion 101 of the annular member 88. Then, the seal member 121 is disposed in the concave portion 123 so as to come into contact with the outer peripheral surface of the end pipe 71. Further, a concave portion 124 recessed radially inward is formed in the outer peripheral surface of the annular member 87. Then, the seal member 122 is disposed in the concave portion 124 so as to come into contact with the inner peripheral surface of the tubular portion 100 of the annular member 88. In this way, it is possible to eliminate the locking members 106 and 110, and therefore, it is possible to reduce cost. In addition, a combination of the seal member 90 and the seal member 122 is also acceptable, and a combination of the seal member 91 and the seal member 121 is also acceptable.

Figure 7:
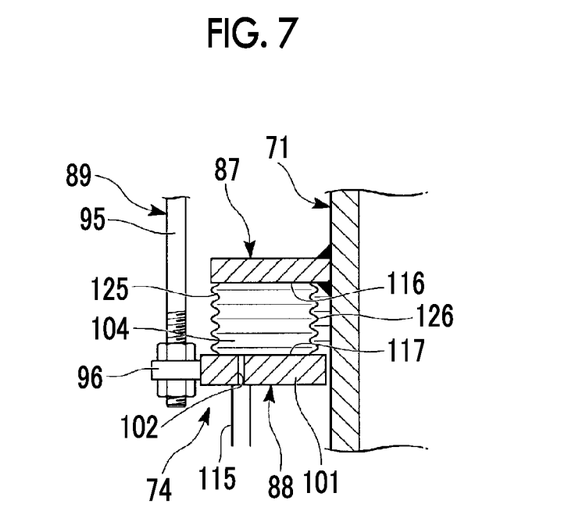
FIG. 7 is a partial cross-sectional view showing another modified example of the expansion joint according to the embodiment.

Further, for example, in the thrust absorption mechanism 74, a configuration is also acceptable in which the tubular portion 100 of the annular member 88 is eliminated and the annular members 87 and 88 are connected by two bellows 125 and 126 capable of expanding and contracting, as shown in FIG. 7. That is, the bellows 125 on one side is made so as to have a larger diameter than the bellows 126 on the other side, and these bellows are coaxially disposed and respectively connected to the annular members 87 and 88. In this case, the fixing member 96 of the extension section 89 is connected to the basal plate portion 101 of the annular member 88. In this structure, a space between the bellows 125 having a larger diameter and the bellows 126 having a smaller diameter becomes the pressure chamber 114. In this way, it is possible to eliminate the seal members 90 and 91. Accordingly, it is possible to improve durability.

Figure 8:
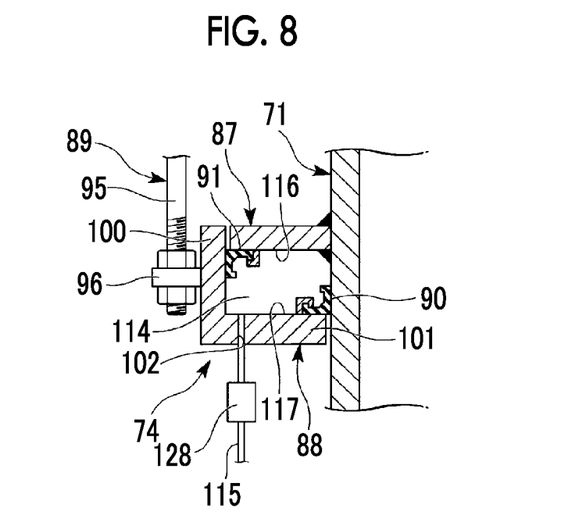
FIG. 8 is a partial cross-sectional view showing still another modified example of the expansion joint according to the embodiment.

Further, as shown in FIG. 8, a pressure adjustment valve 128 (pressure adjustment means) for adjusting the pressure of the compressed air which is supplied to the pressure chamber 114 of the thrust absorption mechanism 74 may be provided in the supply pipe 115. By adjusting the pressure of the compressed air which is supplied to the pressure chamber 114 by the pressure adjustment valve 128, it becomes possible to effectively cancel a thrust which is generated in the end pipes 71 and 72.

It is favorable if a fluid pressure which is higher than the internal pressure of the pipes which are connected by each of the expansion joints 10(A) to 10(E) is introduced into the pressure chamber 114 of the thrust absorption mechanism 74. Accordingly, the compressed air compressed in the medium-pressure compression mechanism 27 may be supplied to the pressure chambers 114 of, for example, the expansion joints 10(A) to 10(C). Further, pressure may be introduced from another device other than the compression mechanisms 27 and 28 into the pressure chambers 114 of the expansion joints 10(A) to 10(E). In this case, a liquid pressure rather than a gas pressure may be introduced. That is, it is favorable if a fluid pressure is introduced into the pressure chamber 114.

Further, a bellows may be used as the connecting pipe 73 which connects the end pipes 71 and 72 so as to be capable of coming close to each other and separating from each other.

INDUSTRIAL APPLICABILITY

The present invention can be widely applied to an expansion joint and a compression system in which relative displacement occurs at a position where both ends are connected.

REFERENCE SIGNS LIST

10(A) to 10(E): expansion joint
11: compression system
25, 26: low-pressure compression mechanism
27: medium-pressure compression mechanism
28: high-pressure compression mechanism
37, 42, 52, 62: exhaust air duct (pipe)
41, 51, 61: air intake duct (pipe)
45, 46, 55: introduction port (pipe)
47, 56: discharge port (pipe)
71, 72: end pipe
73: connecting pipe
74: thrust absorption mechanism (thrust-absorbing means)
87, 88: annular member
89: extension section
90, 91, 121, 122: seal member
100: tubular portion
114: pressure chamber
115: supply pipe
116, 117: pressure-receiving section
125, 126: bellows
128: pressure adjustment valve (pressure adjustment means)

The invention claimed is:

1. An expansion joint which connects pipes to each other and is capable of expanding and contracting, comprising:
an end pipe on one side and an end pipe on the other side;
a connecting pipe which connects the end pipe on one side and the end pipe on the other side so as to be capable of coming close to each other and separating from each other;
thrust-absorbing means having a pressure chamber which can expand and contract in a direction along the axis connecting the end pipe on one side and the end pipe on the other side and into which a fluid pressure different from a pressure in the pipes can be introduced, the pressure chamber having a pressure-receiving section on one axial end, which is fixed to the end pipe on one side and faces in a direction from the end pipe on the other side to the end pipe on one side, and a pressure-receiving section opposing the pressure-receiving section at the one axial end, which is fixed to the end pipe on the one side and faces in a direction from the end pipe on one side to the end pipe on the other side; and wherein the pressure-receiving section on the one axial end is an annular member, which is fixed in an axial range of an outer peripheral surface of the end pipe on one side, and the opposing pressure-receiving section is an annular member, which is fixed to an extension section extending toward the pipe end on the other side from an outer peripheral surface of the end pipe on the one side and is disposed over an annular fixing plate on the end pipe on the other side.

2. The expansion joint according to claim 1, wherein the opposing annular member is provided with a tubular portion extending in a direction toward the annular member on the one axial end from an outer peripheral portion of the opposing annular member, and the expansion joint further includes a seal member on one side, which seals a gap between an outer peripheral portion of the end pipe on one side and an inner peripheral portion of the annular member on the other side, and a seal member on the other side, which seals a gap between an inner peripheral portion of the tubular portion of the annular member on the one axial end and an outer peripheral portion of the annular member on the one axial end.

3. The expansion joint according to claim 2, wherein at least one of the seal member on one side and the seal member on the other side is a lip seal.

4. A compression system in which pipes are connected by the expansion joint according to claim 3.

5. The expansion joint according to claim 2, wherein at least one of the seal member on one side and the seal member on the other side is an O-ring.

6. A compression system in which pipes are connected by the expansion joint according to claim 5.

7. A compression system in which pipes are connected by the expansion joint according to claim 2.

8. The expansion joint according to claim 1, wherein the annular member on the one axial end and the opposing annular member are connected by a bellows.

9. A compression system in which pipes are connected by the expansion joint according to claim 8.

10. A compression system in which pipes are connected by the expansion joint according to claim 1.

11. The compression system according to claim 10, comprising:

compression mechanisms of plural stages, wherein a pipe for circulating a compressed gas discharged from the compression mechanism of an upstream stage and a pipe for circulating a compressed gas which is supplied to the compression mechanism of a downstream stage are connected by the expansion joint.

12. The compression system according to claim 11, wherein the thrust-absorbing means of the expansion joint is provided with a supply pipe which supplies a compressed gas compressed in the compression mechanism further toward the downstream side than the expansion joint.

13. The compression system according to claim 12, further comprising:

pressure adjustment means for adjusting a fluid pressure which is supplied to the thrust-absorbing means.

14. The compression system according to claim 11, further comprising:

pressure adjustment means for adjusting a fluid pressure which is supplied to the thrust-absorbing means.

15. The compression system according to claim 10, further comprising:

pressure adjustment means for adjusting a fluid pressure which is supplied to the thrust-absorbing means.

16. A compression system in which pipes are connected by the expansion joint according to claim 1.

* * * * *